US008767545B2

(12) United States Patent
Giaretta et al.

(10) Patent No.: US 8,767,545 B2
(45) Date of Patent: Jul. 1, 2014

(54) RADIO ACCESS NETWORK CONTROL OF MULTIMEDIA APPLICATION DATA RATES

(75) Inventors: Gerardo Giaretta, San Diego, CA (US); Nikolai K. Leung, Takoma Park, MD (US); Osok Song, San Diego, CA (US); Haipeng Jin, Carlsbad, CA (US); Farrokh Khatibi, San Diego, CA (US); Ramachandran Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 944 days.

(21) Appl. No.: 12/816,337

(22) Filed: Jun. 15, 2010

(65) Prior Publication Data

US 2011/0141890 A1   Jun. 16, 2011

Related U.S. Application Data

(60) Provisional application No. 61/187,221, filed on Jun. 15, 2009.

(51) Int. Cl.
  *H04L 12/26* (2006.01)
(52) U.S. Cl.
  USPC .............................. 370/232; 370/252; 370/352
(58) Field of Classification Search
  USPC ......... 370/229–235, 252–253, 352, 238, 412, 370/329, 395.2; 709/222–223, 226–233; 358/1.15
  See application file for complete search history.

(56) References Cited

U.S. PATENT DOCUMENTS

| | | | | |
|---|---|---|---|---|
| 6,700,676 | B1 * | 3/2004 | Leung et al. | 358/1.15 |
| 7,907,524 | B2 * | 3/2011 | Willars et al. | 370/230 |
| 7,944,880 | B2 * | 5/2011 | Skog et al. | 370/329 |
| 2005/0232148 | A1 * | 10/2005 | Curcio et al. | 370/230 |
| 2007/0064710 | A1 | 3/2007 | Holmstrom et al. | |
| 2007/0223450 | A1 * | 9/2007 | Holmstrom et al. | 370/352 |
| 2009/0067335 | A1 * | 3/2009 | Pelletier et al. | 370/238 |
| 2009/0245108 | A1 * | 10/2009 | Wu et al. | 370/233 |
| 2010/0067400 | A1 * | 3/2010 | Dolganow et al. | 370/253 |
| 2010/0128722 | A1 * | 5/2010 | Madour et al. | 370/352 |
| 2010/0284278 | A1 * | 11/2010 | Alanara | 370/235 |

(Continued)

OTHER PUBLICATIONS

3gpp TR 23.818 VO.10.0, 3rd generation partnership project; technical specification group services and architecture; optimisations and enhancements for realtime IMS communication release 7, Feb. 2007.*

(Continued)

*Primary Examiner* — Michael Thier
*Assistant Examiner* — Vincelas Louis
(74) *Attorney, Agent, or Firm* — Ashish L. Patel

(57) ABSTRACT

This disclosure enables a radio access network to control media data rates and codec parameters selected during multimedia session establishment. As the load on a radio network changes, operators desire to have the ability to control what data rate new multimedia sessions (e.g., VoIP) are to utilize, thereby allowing the operator to conduct a trade-off between voice/video quality and capacity during heavy loading periods. The multimedia communication session may be initiated with a determined guaranteed bit rate, where the guaranteed bit rate is requested, negotiated as one of several acceptable guaranteed bit rates, or based upon maximum system capacity, to take advantage of maximum data rate for the equipment in use. The session may also be initiated with a determined Quality of Service based upon either a network or user equipment installed policy.

20 Claims, 12 Drawing Sheets

(56) References Cited

U.S. PATENT DOCUMENTS

| | | | |
|---|---|---|---|
| 2011/0122886 A1* | 5/2011 | Willars et al. ................. | 370/412 |
| 2011/0208853 A1* | 8/2011 | Castro-Castro et al. ...... | 709/223 |
| 2011/0267944 A1* | 11/2011 | Stjernholm et al. .......... | 370/230 |

OTHER PUBLICATIONS

3GPP TR 23.818 V0.7.0 (Sep. 2006), 3rd Generation Partnership Project; Technical Specification Group Services and Architecture; Optimisations and Enhancements for Realtime IMS communication (Release 7).

3rd Generation Partnership Project; Technical Specification Group Services and System Aspects; 3GPP System Architecture Evolution: Report on Technical Options and Conclusions (Release 8) , 3GPP Standard; 3GPP TR 23.882, 3rd Generation Partnership Project (3GPP) , Mobile Competence Centre ; 650, Route Des Lucioles ; F-06921 Sophia-Antipolis Cedex ; France, No. V8.0.0, Sep. 1, 2008, pp. 1-234, XP050364130.

International Search Report and Written Opinion—PCTIUS2010/038733—ISA/EPO—Feb. 10, 2011.

Taiwan Search Report—TW099119626—TIPO—Apr. 9, 2013.

* cited by examiner

RADIO ACCESS NETWORK CONTROL OF MULTIMEDIA APPLICATION DATA RATES

CROSS-REFERENCE TO RELATED APPLICATIONS

This application claims priority under 35 U.S.C. §119(e) to U.S. Provisional Application No. 61/187,221, filed on Jun. 15, 2009. The entire contents of this prior application are incorporated herein by reference.

BACKGROUND OF THE INVENTION

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include but are not limited to code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

SUMMARY

This document provides exemplary implementations of systems and methods for enabling a radio access network to control media data rates and codec parameters selected during multimedia session establishment.

In an exemplary implementation, as the load on a radio network changes, operators desire to have the ability to control what data rate new multimedia sessions (e.g., VoIP) are to utilize, thereby allowing the operator to conduct a trade-off between voice/video quality and capacity during heavy loading periods. Accordingly, techniques for providing such functionality in a wireless communication network are provided herein. The techniques described herein can be utilized for any suitable wireless communication system, such as 3GPP LTE networks, HSPA networks, 3GPP2 networks, and/or any other suitable network(s).

Additional implementations are described that provide example configurations having advantages for various levels of control in the setup and operation of data rates and quality of service for completed connections. Various implementations may be selected to minimize the call setup delay, to minimize impact to network specifications or specifications of User Equipment (UE), and/or provide for backward compatibility with UE having earlier release or previous generation capabilities.

BRIEF DESCRIPTION OF THE DRAWINGS

The features, nature, and advantages of the disclosed method and apparatus will become more apparent from the detailed description set forth below when taken in conjunction with the drawings in which like reference characters identify correspondingly throughout.

DETAILED DESCRIPTION OF THE INVENTION

Figure 1:
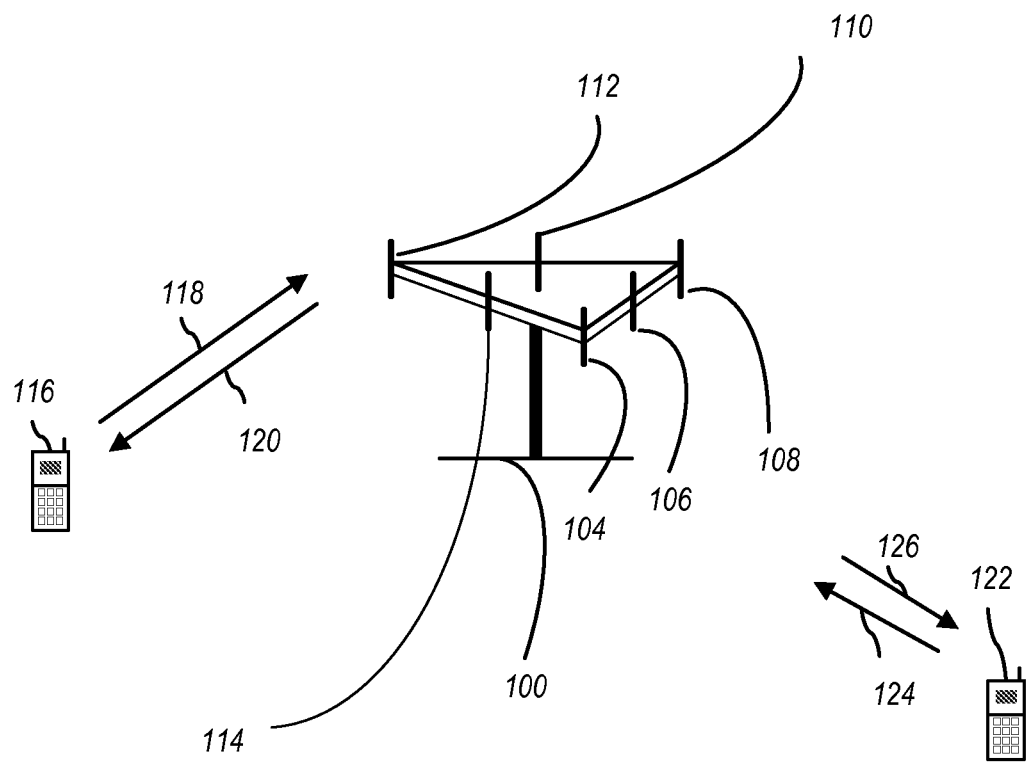
FIG. 1 illustrates an exemplary multiple access wireless communication system according to one embodiment.

This document presents exemplary implementations of techniques for rate adaptation (e.g., for vocoder, video codec, FTP (File Transfer Protocol) throughput and/or TCP (Transmission Control Protocol) throughput) during call set-up, which include, for example, mechanisms by which an Evolved Node B (eNB) of an LTE system can trigger voice coder (vocoder) rate adaptation. Vocoder rate adaptation can be utilized to allow an eNB to adapt a vocoder rate selected at call set-up to accommodate available radio resources. In an exemplary implementation, the eNB is enabled to affect the selection of codec rate at a VoIP (Voice over IP) call set-up based on the eNB's loading conditions. Under current implementations of the LTE system, eNB is not involved in the call set-up. Instead, the eNB simply passes call set-up communications between the core network and the UE, as explained in more detail below. Without the present system, a call set-up might fail because the vocoder rate determined due to the UE and core network interaction might be too high for the particular eNB to handle at a particular time, and/or might cause the eNB to have to lower the rates, block the establishment, or terminate on-going sessions of other services due to lack of capacity.

Continuing the implementation, it is desirable to avoid requiring any codec knowledge at the eNB. It can be appreciated that this is due to the fact that the eNB is conventionally not required to be codec-aware and may not know the different codec modes and rates which are deployed in User Equipment (UE) throughout the network.

These features of the presently disclosed system provide operators with the capability to increase capacity of a given cell in selected areas or selected times of the day.

Vocoder rate adaptation can be utilized to mimic the functionality currently available in the Universal Mobile Telephone System (UMTS) where the UMTS Terrestrial Radio Access Network (UTRAN) (e.g., Radio Network Controller) can indicate a different codec rate to the UE. Previous procedures do not allow the Evolved-UTRAN (e.g., the eNB) to influence the codec rate, as the eNB is not involved in any negotiation of the codec or the Guaranteed Bit Rate (GBR) of the bearer which is established for a call, as mentioned above.

The exemplary implementations described in this document may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is an implementation technique that may be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one embodiment is illustrated. An access point 100 (AP) includes multiple antenna groups, one including two antenna groups 104 and 106, another including a different pair of antenna groups 108 and 110, and an additional including yet a different pair 112 and 114, as examples, each pair being in a line and the lines forming a triangle, for example. In FIG. 1, only two antennas are shown for each antenna group, however, more or fewer antennas can be utilized for each antenna group and more or fewer antenna groups can be present. A first access terminal (AT) 116 is in communication with a first group of antennas 112 and 114, where the first group of antennas 112 and 114 transmit information to the first access terminal 116 over a first forward link 120 and receive information from the first access terminal 116 over a first reverse link 118. A second access terminal 122 is in communication with a second group of antennas 106 and 108, where the second group of antennas 106 and 108 transmit information to the second access terminal 122 over a second forward link 126 and receive information from the second access terminal 122 over a second reverse link 124. In a Frequency Division Duplex (FDD) system, the forward and reverse communication links 118, 120, 124 and 126 can use different frequencies for communication. For example, the first forward link 120 can use a different frequency then that used by the first reverse link 118 for the first AT 116.

Each group of antennas and/or the area in which they are designed to communicate is often referred to as a sector of the access point. In the embodiment, respective antenna groups are designed to communicate to access terminals in a sector of the areas covered by access point 100.

In communication over forward links 120 and 126, the transmitting antennas of the access point 100 can utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point can be a fixed station used for communicating with the terminals and may be referred to as an access point, base, station, a Node B, an evolved Node B (eNB), or some other terminology. An access terminal (AT) can be called an access terminal, user equipment (UE), a wireless communication device, mobile station, mobile unit, mobile device, mobile terminal, cell phone, handset, terminal, or some other terminology.

Figure 2:
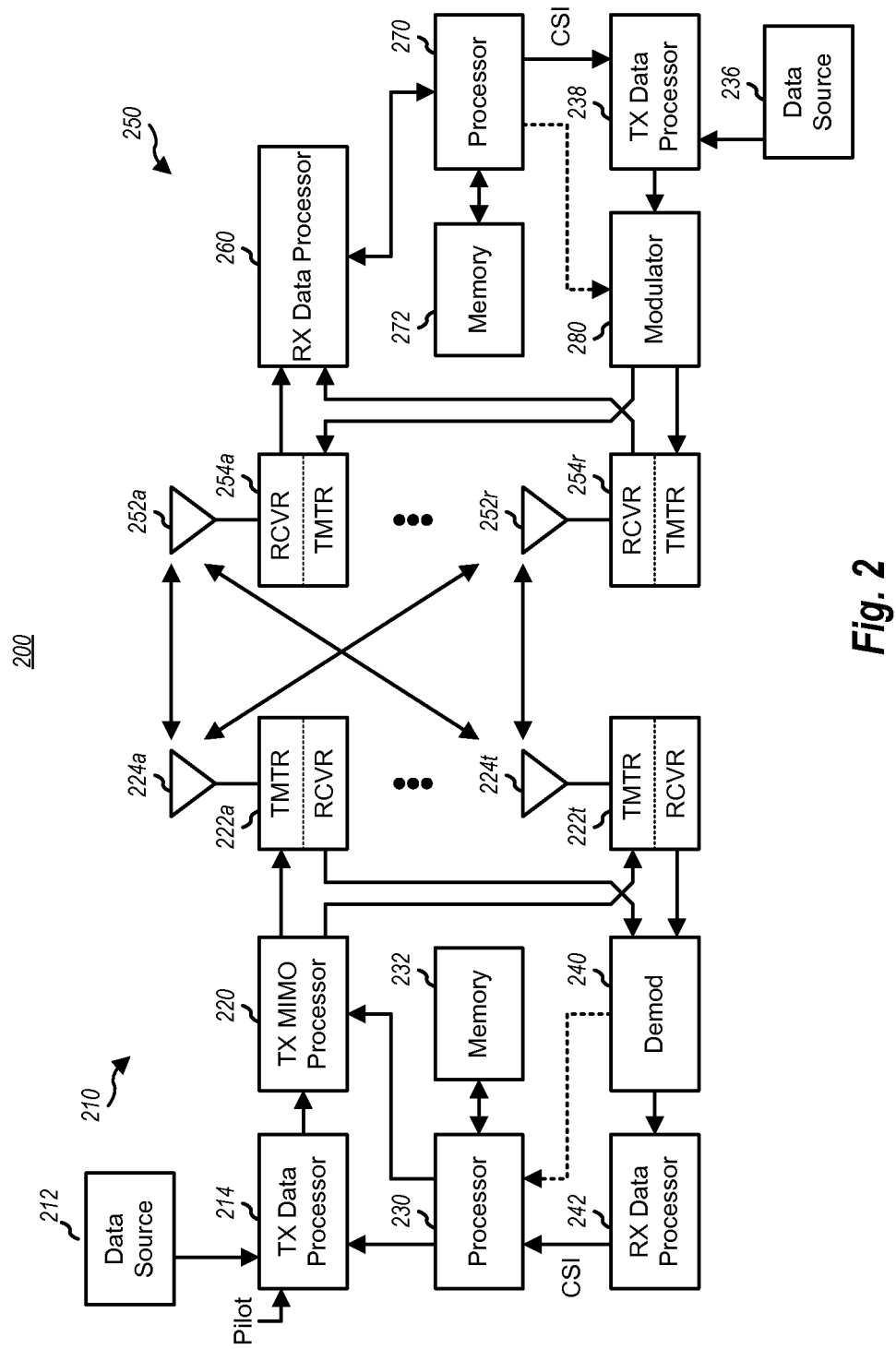
FIG. 2 is a block diagram of an exemplary communication system.

FIG. 2 is a block diagram of an embodiment of a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream can be multiplexed with pilot data using OFDM techniques to name one example. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by processor 230.

The modulation symbols for respective data streams are then provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beam forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message can comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprise a Broadcast Control Channel (BCCH), which is a DL (DownLink) channel for broadcasting system control information; a Paging Control Channel (PCCH), which is a DL channel that transfers paging information; and a Multicast Control Channel (MCCH), which is a point-to-multipoint DL channel used for transmitting Multimedia Broadcast and Multicast Service (MBMS) scheduling and control information for one or several MTCHs (MBMS point-to-multipoint Traffic Channel). Generally, after establishing a Radio Resource Control (RRC) connection this channel is only used by UEs that receive MBMS (Note: old MCCH+MSCH (MBMS point-to-multipoint Scheduling Channel)). Dedicated Control Channel (DCCH) is a point-to-point bi-directional channel that transmits dedicated control information and used by UEs having an RRC connection. In an aspect, Logical Traffic Channels comprise a Dedicated Traffic Channel (DTCH), which is a point-to-point bi-directional channel, dedicated to one UE, for the transfer of user information; and a Multicast Traffic Channel (MTCH), which is a point-to-multipoint DL channel for transmitting traffic data.

In an aspect, Transport Channels are classified into DL and UL (UpLink). DL Transport Channels comprise a Broadcast Channel (BCH), Downlink Shared Data Channel (DL-SDCH) and a Paging Channel (PCH), the PCH for support of UE power saving (DRX (Discontinuous Reception) cycle is indicated by the network to the UE), broadcasted over entire cell and mapped to PHY (Physical Layers) resources which can be used for other control/traffic channels. The UL Transport Channels comprise a Random Access Channel (RACH), a Request Channel (REQCH), a Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an exemplary implementation, a channel structure is provided that preserves low Peak to Average Ration (PAR) (at any given time, the channel is contiguous or uniformly spaced in frequency) properties of a single carrier waveform.

Figure 3:
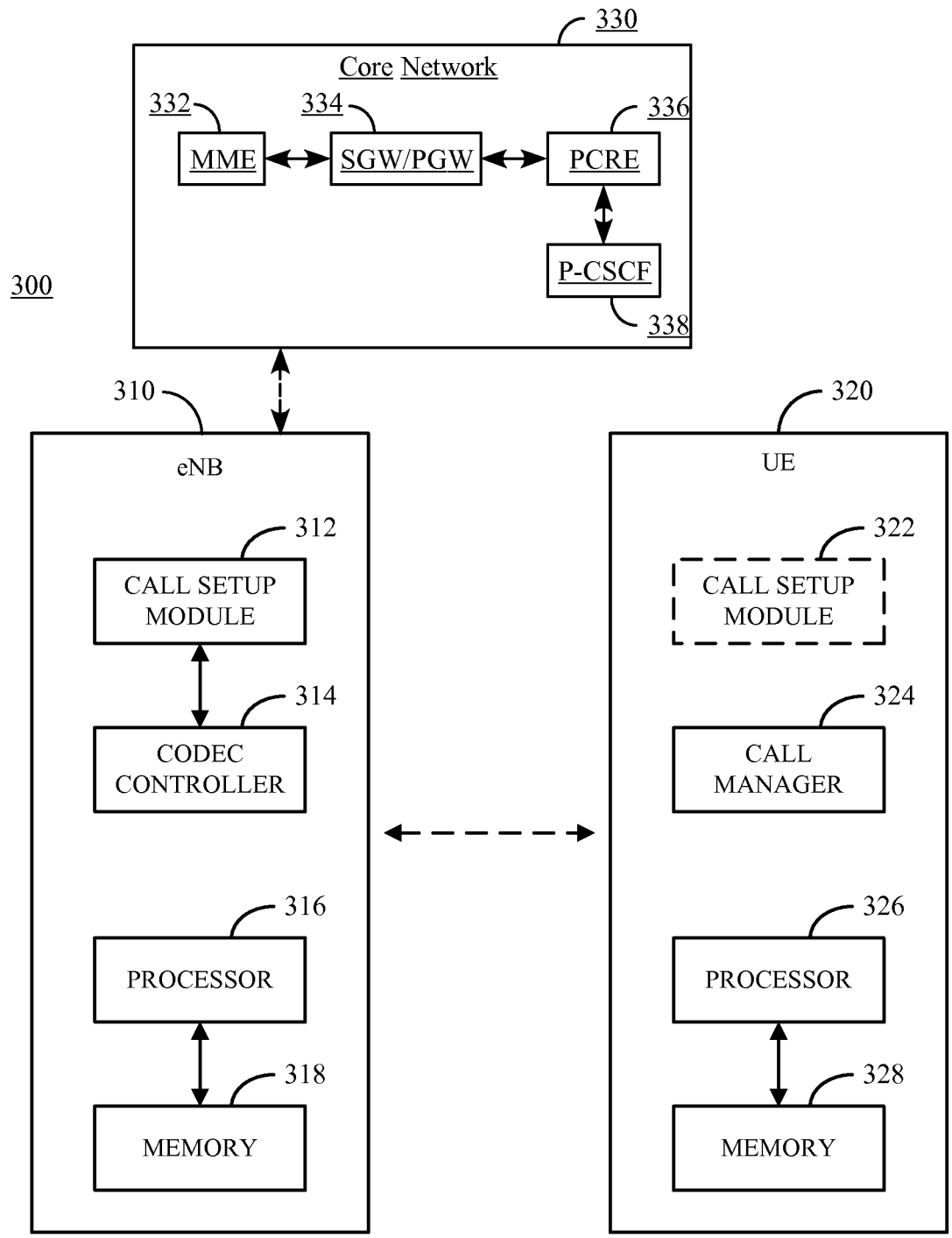
FIG. 3 is a block diagram of a system for vocoder rate adaptation in connection with a wireless communication session according to an exemplary embodiment.

Turning to FIG. 3, a block diagram of an exemplary system 300 for vocoder rate adaptation in connection with a wireless communication session is illustrated. The system 300 can include an eNB 310, which can transmit data, control signaling, and/or other information to one or more UEs 320. In one example, a call setup module 312 at eNB 310, and/or an optional call setup module 322 at UE 320, can be utilized to conduct one or more procedures relating to the setup of a VoIP and/or other suitable communication session between eNB 310 and UE 320. In an exemplary implementation, eNB 310 can further utilize a codec controller 314, which can dynamically adjust one or more parameters of the communication session between eNB 310 and UE 320 upon its initialization in accordance with one or more techniques provided herein. Additionally, the eNB 310 can subsequently provide generated parameters to UE 320, which can utilize the parameters in connection with the communication session via a call manager 324.

In another exemplary implementation, eNB 310 can include a processor 316 and/or memory 318 operable to implement at least a portion of network functionality described herein. Further, UE 320 can include a processor 326 and/or memory 328 to implement at least a portion of the user functionality described herein.

Figure 9:
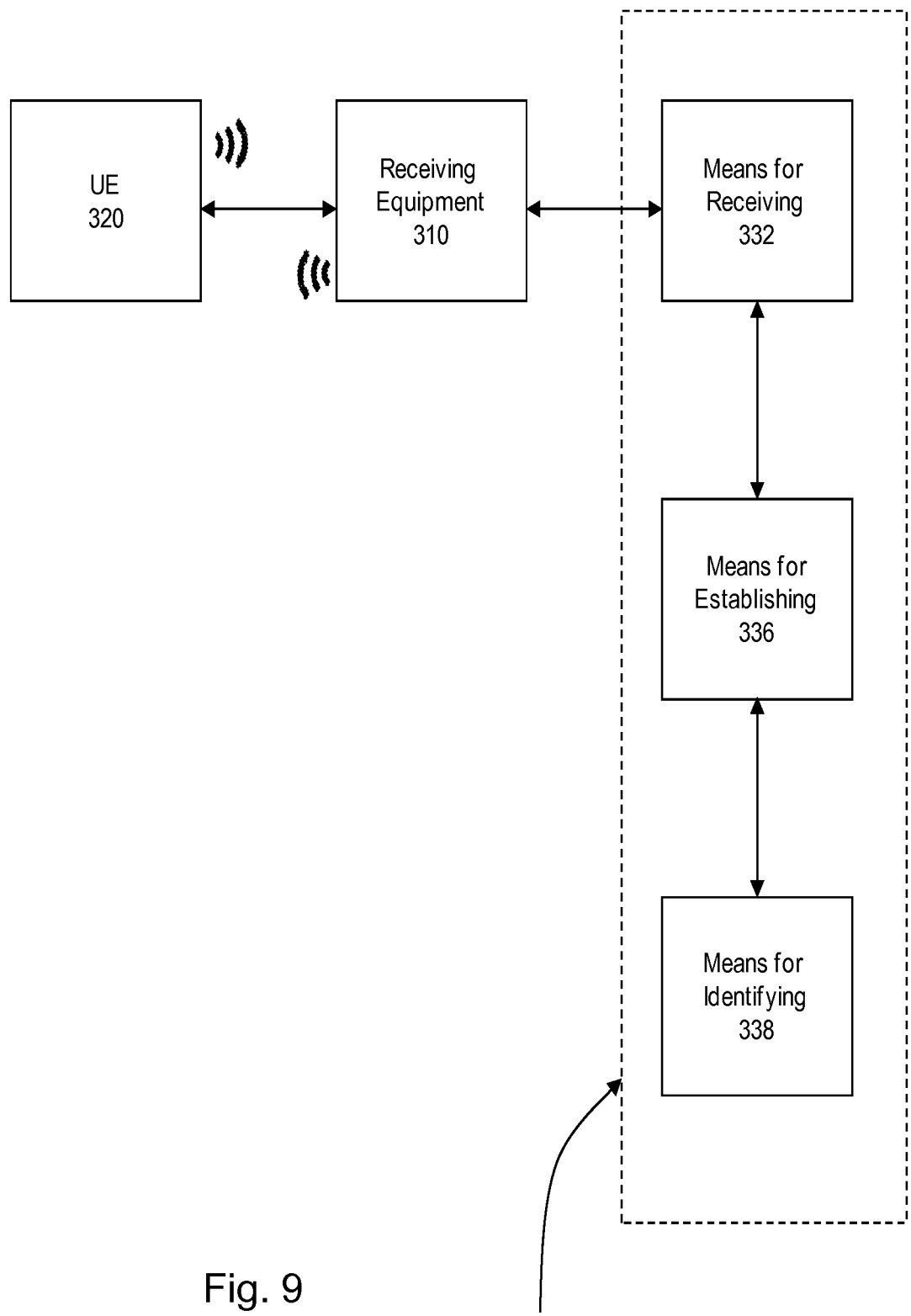
FIG. 9 is a means-plus-function flow diagram in an exemplary implementation.

Additionally, a core network 330 communicates with the eNB 310 and the UE 320 through the eNB 310. The core network includes circuitry and functionality such as MME (Mobility Management Entity) 332, SGW/PGW (Signalling GW/Protocol GW) 334, PCRF (Policy control and Charging Rules Function) 336 and P-CSCF (Proxy Call Session Control Function) 338, which are further described below. It should be noted that FIG. 9 corresponds to FIG. 3, but is in a means-plus-function flow diagram format showing an exemplary implementation. More specifically, FIG. 9 shows a wireless communication apparatus that includes means (e.g., P-CSCE) 338 for identifying initialization of a multimedia communication session between user equipment 320 over a core network 330 and at least one receiving equipment (e.g., eNB) 310. It also includes means (e.g., PCRE) 336 for establishing a bit rate for the multimedia communication session between user equipment 320, and means (e.g., MME) 332 for receiving communications of information identifying a bit rate that is acceptable to the receiving equipment 310 related to the multimedia communication session to the means for establishing a bit rate. As with FIG. 3, the means for establishing a bit rate establishes a bit rate at or below the bit rate that is acceptable to the receiving equipment 310 related to the multimedia communication session, the bit rate being a guaranteed bit rate for said multimedia communication session for the user equipment 320.

Figure 4:
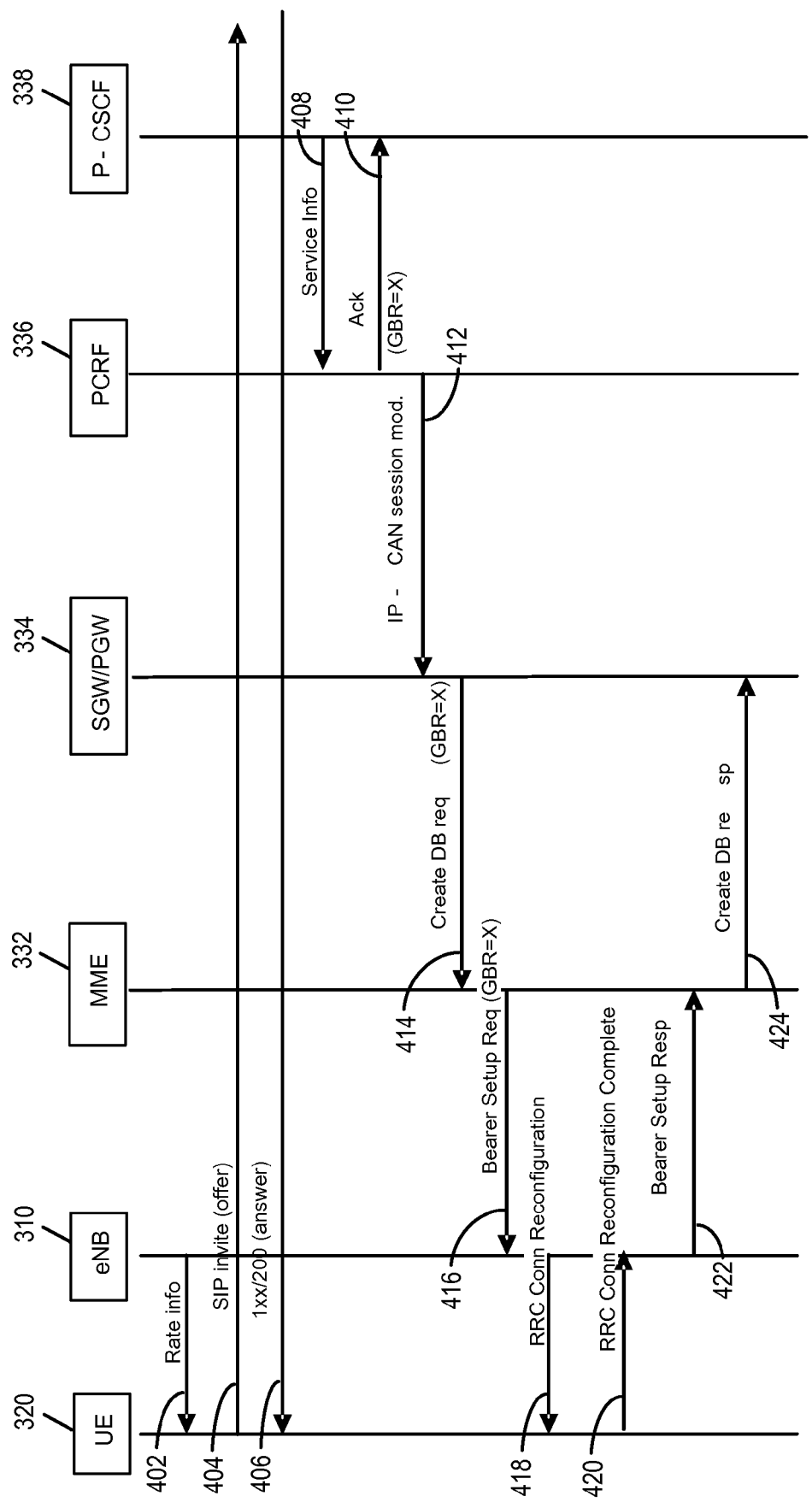
FIG. 4 is a call setup diagram establishing the user equipment maximum bit rate in an exemplary implementation.

In FIG. 4 an exemplary implementation of a call setup process in which an eNB 310 can transmit broadcast load information over the air indicating the maximum possible rate to be used for a VoIP session is presented. In this exemplary implementation, the information can be QCI-specific (QoS Class Identifier-Specific such that the eNB 310 can indicate the service type (e.g., VoIP) to which the maximum rate restriction applies. The broadcast load information can also independently indicate the rate in different directions (uplink and downlink).

To initiate the call setup process for this example, at 402 the eNB 310 broadcasts or unicasts information about the rate that is acceptable to the eNB 310 at any given time for a VoIP call establishment. This information can be provided per QCI in the event that it relates only to VoIP calls. In one example, maximum rate information for other types of services can also be broadcast/unicast by linking them to a particular QCI. When the UE 320 initiates a call with an offer 404 and receives an answer 406, the UE 320 considers the maximum rate information provided by the eNB 310 and selects codec parameters (e.g., codec, codec modes, and codec rates) accordingly in the offer 404 404 (Session Initiation Protocol (SIP) invite) or answer 406 (1xx/200, where the "xx" are integers that identify a particular message).

At 408 of this exemplary implementation, the Proxy Call Session Control Function (P-CSCF) 338 of the core network 330 provides service information to the Policy control and Charging Rules Function (PCRF) 336 in order to establish QoS resources for the call establishment. This information can include Session Description Protocol (SDP) parameters and/or codec information. The PCRF 336 transmits an acknowledgement to complete the handshake at 410. If dynamic Policy and Charging Control (PCC) is deployed in the system, the PCRF sends a PCC decision provision message (e.g., an IP Controller Area Network (CAN) session modification message) to the Packet Data Network (PDN) Gate Way (GW) 334 of the core network 330 at 412, which can specify a QoS policy and/or include the QCI and the GBR values. At 414, the PDN GW 334 uses the QoS policy to assign an Evolved Packet System (EPS) Bearer QoS. In this example implementation, the PDN GW 334 can assign values to various bearer level QoS parameters (e.g., QCI, Access Resolution Protocol (ARP), GBR, Minimum Bit Rate (MBR), etc.). Additionally, the Serving GW 336 can transmit a Create Bearer Request to the Mobility Management Entity (MME) 332. At 416, the MME 332 selects an EPS Bearer Identity, which has not yet been assigned to the UE 320. The MME 332 then builds a Session Management Request that can include, among other parameters, the EPS Bearer QoS parameters. The MME 332 then signals a Bearer Setup Request message to the eNB, which can specify an EPS Bearer Identity, EPS Bearer QoS, Session Management Request, and S1-Tunnel Endpoint Identifier (TEID). At 418, the eNB 310 maps the EPS Bearer QoS to the Radio Bearer QoS and signals a RRC Connection Reconfiguration message to the UE 320 that specifies a Radio Bearer QoS, Session Management Request, and EPS RB (Radio Bearer) Identity.

After receiving the Radio Resource Control (RRC) Connection Reconfiguration message, the UE 320 acknowledges the radio bearer activation to the eNB 310 with a RRC Connection Reconfiguration Complete message at 420. The UE Non-Access Stratum (NAS) layer additionally builds a Session Management Response including EPS Bearer Identity. While not shown in FIG. 4, the UE 320 can then transmit a Direct Transfer message to the eNB 310 that includes a Session Management Response. At 422, the eNB 310 acknowledges the bearer activation to the MME 332 with a Bearer Setup Response message that includes an EPS Bearer Identity and S1-TEID. The eNB 310 further indicates that the requested EPS Bearer QoS was allocated. Additionally, the eNB 310 transmits an Uplink NAS Transport message to the MME 332 that includes a Session Management Response. Upon reception of the Bearer Setup Response message and the Session Management Response message, the MME 332 acknowledges the bearer activation to the Serving GW 334 at 424. The Serving GW acknowledges the bearer activation to the PDN GW 334.

Advantageously, FIG. 4 presents an implementation which facilitates voice coder rate adaptation functionality without requiring changes to core network procedures and protocols and/or additional call setup delay.

Figure 5:
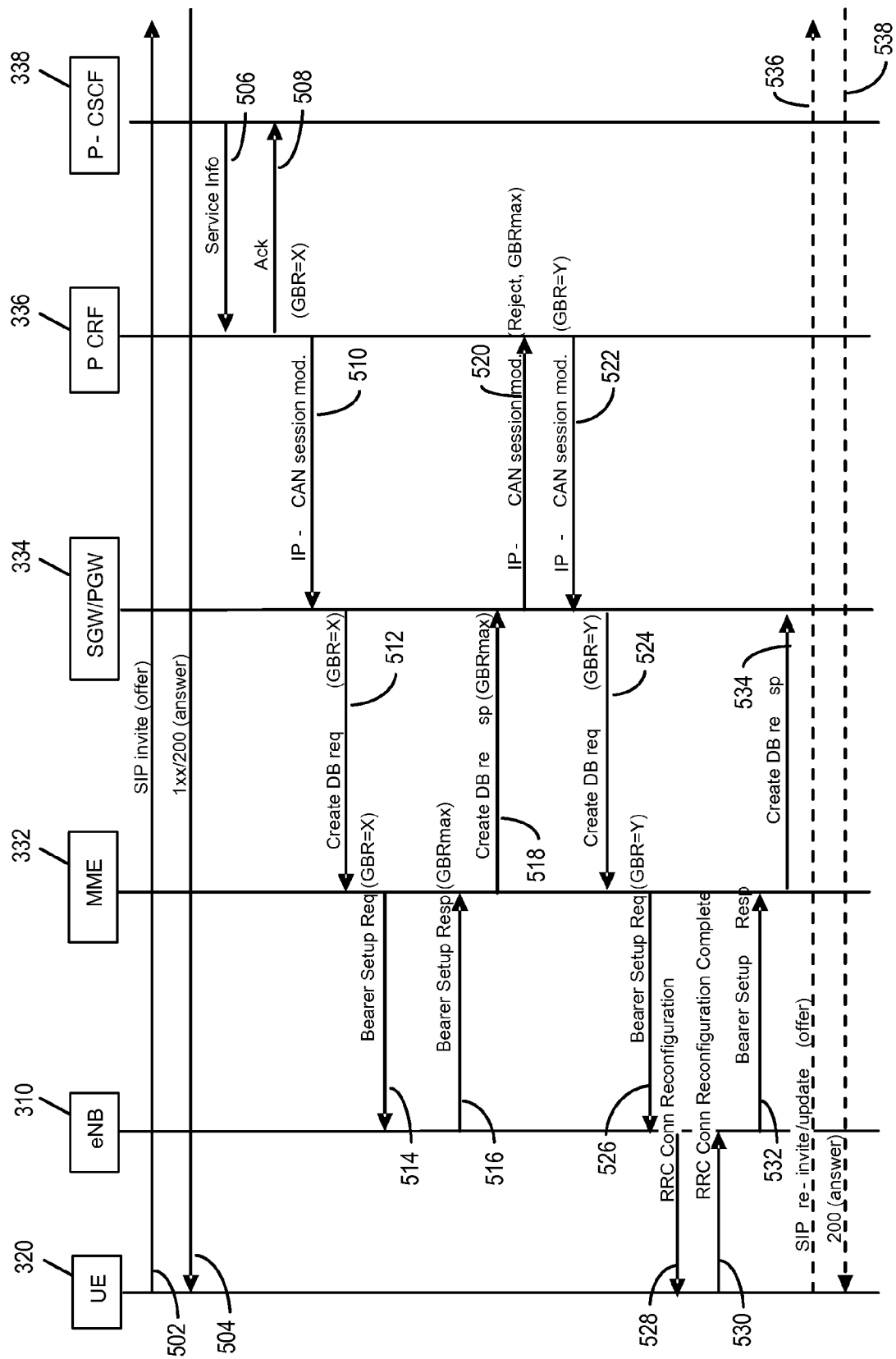
FIG. 5 is a call setup diagram establishing a maximum supported bit rate for UE in an exemplary implementation.
Figure 6:
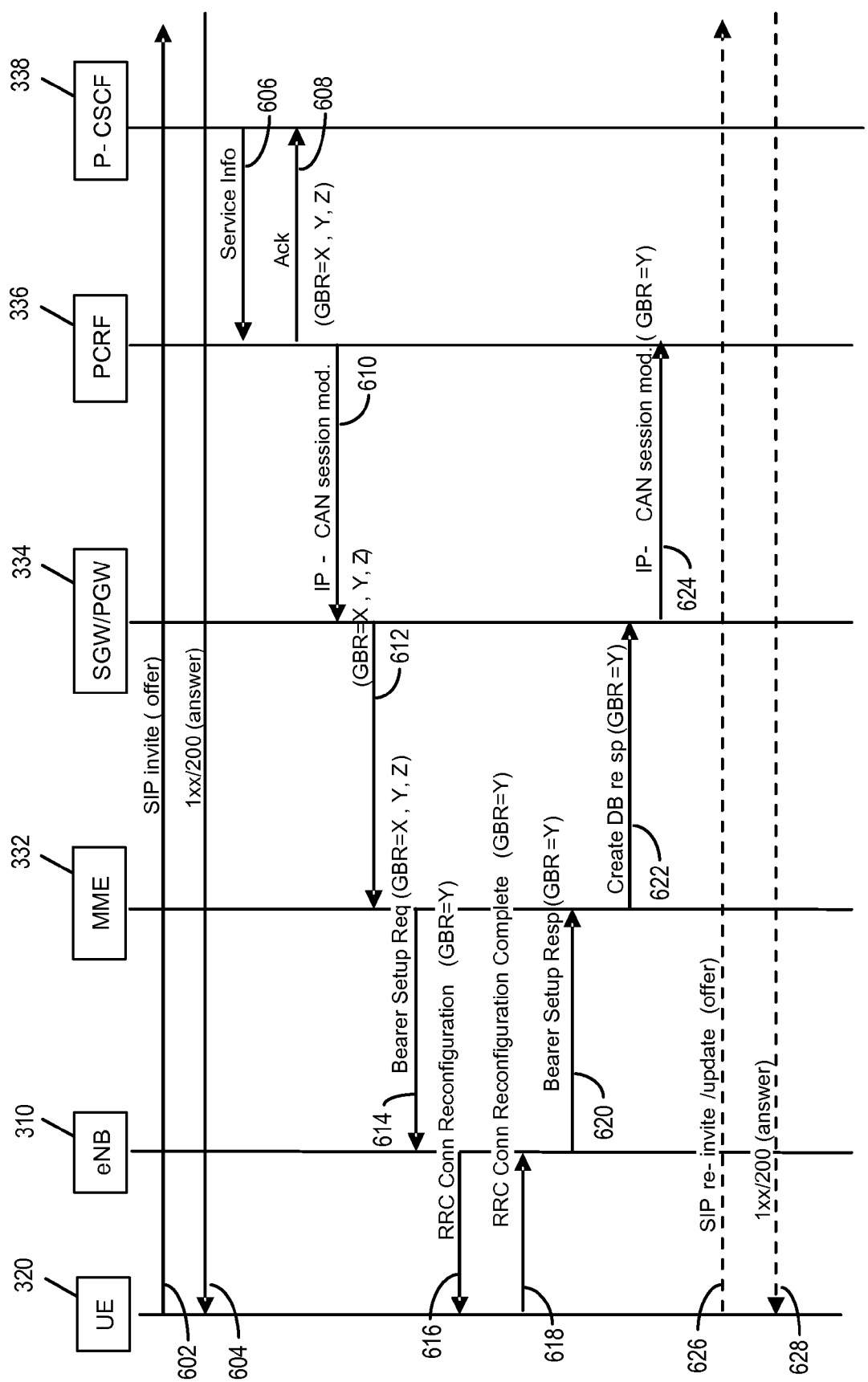
FIG. 6 is a call setup diagram negotiating a maximum supported bit rate for UE in an exemplary implementation.
Figure 10:
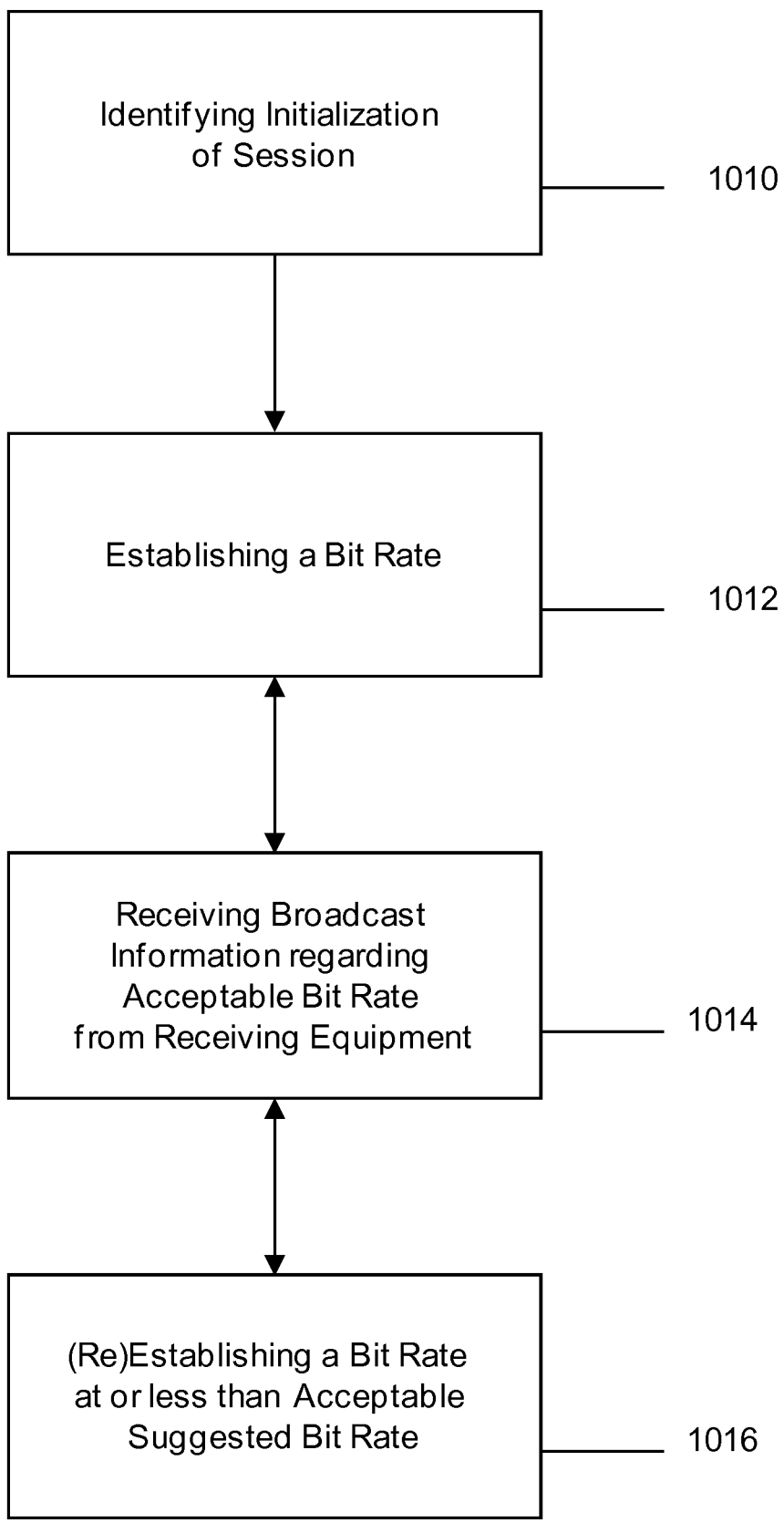
FIG. 10 is a call setup flow chart establishing a maximum supported bit rate with call setup in an exemplary implementation.

FIG. 10 is a flow chart showing the underlying method used in a wireless communication system of FIGS. 4, 5 and 6. The more broadly described method includes identifying initialization of a multimedia communication session between user equipment over a core network 330 and at least one receiving equipment (e.g., eNB) 310 at step 1010, and establishing a bit rate for said multimedia communication session between user equipment 320 at step 1012. Further, the method involves receiving at step 1014 bit rate information regarding a bit rate that is acceptable to the receiving equipment 310 related to the multimedia communication session to establish (step 1016) a bit rate for said multimedia communication session between user equipment 320. A bit rate for the multimedia communication session between user equipment 320 is established at a bit rate at or below the bit rate that is acceptable to the receiving equipment 310 related to the multimedia communication session. This bit rate is a guaranteed bit rate for the multimedia communication session between user equipment.

In FIG. 5 an exemplary implementation of a call setup process in which an eNB 310 can be enabled to communicate to a MME 332, Signalling Gate Way (SGW)/Protocol Gate Way (PGW) 334, PCRF 336, and/or other entities during the bearer establishment procedure in the event that a given requested rate cannot be supported and/or to suggest a maximum rate that can be supported. In this exemplary implementation, the PCRF 336, which can be codec-aware, may select an alternate value for GBR. The UE 310 can then conduct end-to-end re-negotiation of codec parameters in various cases. In this example, the re-negotiation of codec parameters can be achieved via IMS (IP Multimedia Subsystem) exchange, RTP/RTCP (Real-Time Transport Protocol/Real-Time Transport Control Protocol), and/or by any other suitable means.

In the exemplary implementation, the UE 320 initiates a call with an offer 502 and receives an answer 504 in response to the offer 502. 504 The UE 320 performs an IP Multimedia Subsystem (IMS) exchange which includes a negotiation of the codec parameters without involving the eNB 310 other than it passing through communications. At 506, the P-CSCF 338 provides service information to the PCRF 336 in order to establish QoS resources for the call establishment. This information can include SDP parameters and/or codec information. At 508, the PCRF 336 provides an acknowledgement of the message containing the service information to the P-CSCF 338. At 510, if dynamic PCC is deployed, the PCRF 336 sends a PCC decision provision message to the PDN GW 334, which can specify a QoS policy and/or include the QCI and GBR values. At 512, the PDN GW 334 uses the QoS policy to assign an EPS Bearer QoS. For example, the PDN GW 334 can assign values to various bearer level QoS parameters (e.g., QCI, ARP, GBR, MBR, etc.). In an aspect, the Serving GW 334 can additionally transmit a Create Bearer Request to the MME 332. At 514, the MME 332 selects an EPS Bearer Identity, which has not yet been assigned to the UE 320. The MME 332 then builds a Session Management Request that can include, among other parameters, the EPS Bearer QoS parameters. The MME 332 then signals a Bearer Setup Request message to the eNB, which can specify an EPS Bearer Identity, EPS Bearer QoS, Session Management Request, and S1-TEID.

At 516 of the exemplary implementation, the eNB 310 identifies that the GBR requirement for the VoIP call (e.g., identified by the QCI value) needs to be changed from what was initially negotiated between the UEs 320 and the UE at the other side of the communication link). In one example, this can comprise a decision for an implicit voice codec rate change. Further, the eNB 310 can transmit a Bearer Setup Response message to the MME 332 indicating that the bearer could not be established. The eNB 310 includes in the Bearer Setup Response message the maximum value of GBR which can be acceptable for incoming bearer requests related to the same QCI for the UE 320. At 518, upon reception of the Bearer Setup Response message, the MME 332 deletes the NAS context related to the respective request and indicates to the Serving GW 334 that the bearer was not established providing the GBRmax. The Serving GW provides this information to the PDN GW 334. At 520, the PDN GW 334 provides an indication to the PCRF 336 that the resources related to the PCC rule provided above could not be established. Additionally, the PDN GW 334 provides the GBRmax value to the PCRF 336 to indicate the maximum value of the GBR which the eNB 310 can accept. At 522, the PCRF 336, based on the GBRmax value and knowledge of service information, derives a new value for the GBR and sends a PCC decision provision message to the PDN GW 334 that specifies a QoS policy.

At 524, the PDN GW 334 uses the QoS policy to assign an EPS Bearer QoS. In this example implementation, the PDN GW 334 can assign values to various bearer level QoS parameters (e.g., QCI, ARP, GBR, MBR, etc.). Additionally, the Serving GW 334 can transmit a Create Bearer Request to the MME 332. At 526, the MME 332 selects an EPS Bearer Identity, which has not yet been assigned to the UE 320. The MME 332 then builds a Session Management Request that can include, among other parameters, the EPS Bearer QoS parameters. The MME 332 then signals a Bearer Setup Request message to the eNB 310, which can specify an EPS Bearer Identity, EPS Bearer QoS, Session Management Request, and S1-TEID. At 528, the eNB 310 maps the EPS Bearer QoS to the Radio Bearer QoS and signals a RRC Connection Reconfiguration message to the UE 320 that specifies a Radio Bearer QoS, Session Management Request, and EPS RB Identity.

After receiving the RRC Connection Reconfiguration message, the UE 320 acknowledges the radio bearer activation to the eNB 310 with a RRC Connection Reconfiguration Complete message at 530. The UE NAS layer additionally builds a Session Management Response including EPS Bearer Identity. While not shown in FIG. 5, the UE 320 can then transmit a Direct Transfer message to the eNB 310 that includes a Session Management Response. At 532, the eNB 310 acknowledges the bearer activation to the MME 332 with a Bearer Setup Response message that includes an EPS Bearer Identity and S1-TEID. The eNB 310 further indicates that the requested EPS Bearer QoS was allocated. Additionally, the eNB 310 transmits an Uplink NAS Transport message to the MME 332 that includes a Session Management Response. Upon reception of the Bearer Setup Response message and the Session Management Response message, the MME 332 acknowledges the bearer activation to the Serving GW 334 at 534.

Based on the available GBR, the UE 320 can in some cases be required to select new codec parameters and indicate the selection(s) to the other party. In the exemplary implementation, this can be done via an IMS re-INVITE/UPDATE procedure 536 and/or via RTCP/RTP to expedite the adaptation of the other party. In the latter case, an IMS exchange can be required and/or otherwise utilized for charging or other purposes. In each situation an answer 538 is required to establish the acceptance of the new codec parameters.

Advantageously, the exemplary implementation presented in FIG. 5 may facilitate voice coder rate adaptation functionality that is backwards compatible with legacy UEs without requiring changes to NAS protocol and/or network operating procedures in some cases (e.g., when codec rate modification is not needed).

In FIG. 6 an exemplary implementation of a call setup process, wherein different candidate GBR values are carried in the bearer establishment procedures and codec parameters are re-negotiated end-to-end. In the exemplary implementation, the UE 320 initiates a call with an offer 602 and receives an answer 604 to its offer 602 and performs an IMS exchange which includes a negotiation of the codec parameters. At 606, the P-CSCF 338 provides service information to the PCRF 336 in order to establish QoS resources for the call establishment. This information can include SDP parameters and/or codec information. At 608, the PCRF 336 provides an acknowledgement of the message containing the service information to the P-CSCF 338.

At 610 of the exemplary implementation, if dynamic PCC is deployed, the PCRF 336 sends a PCC decision provision message to the PDN GW 334, which can specify a QoS policy. In this message, the PCRF 336, based on knowledge of the service, can provide various candidate GBR values that can correspond to respective codecs, codec modes, rates, or the like. At 612, the PDN GW 334 uses the QoS policy to assign a EPS Bearer QoS. For example, the PDN GW 334 can assign values to various bearer level QoS parameters (e.g., QCI, ARP, GBR, MBR, etc.). In an aspect, multiple values of GBR can be included in the bearer request. In another aspect, the Serving GW 334 can additionally transmit a Create Bearer Request to the MME 332. At 614, the MME 332 selects an EPS Bearer Identity, which has not yet been assigned to the UE 320. The MME 332 then builds a Session Management Request that can include, among other parameters, the EPS Bearer QoS parameters with respective GBR values. The MME 332 then signals a Bearer Setup Request message to the eNB, which can additionally include a plurality of GBR values. At 616, the eNB 310 selects a GBR value that is acceptable for the VoIP call (e.g., identified by the QCI value) and maps the EPS Bearer QoS to the Radio Bearer QoS using the selected GBR value. It then signals a RRC Connection Reconfiguration message to the UE 320 that specifies a Radio Bearer QoS, Session Management Request, and EPS RB Identity.

At 618, the UE 320 acknowledges the radio bearer activation to the eNB 310 with a RRC Connection Reconfiguration Complete message. In one example, at this step the UE 320 can receive a plurality of GBR values in the NAS message but only a single value in the RRC message. In such an example, the UE 320 can consider the value in the RRC message to be valid and accordingly update its bearer context. Further, the UE NAS layer can build a Session Management Response including EPS Bearer Identity. While not shown in FIG. 6, the UE 320 can subsequently transmit a Direct Transfer message to the eNB 310 that includes a Session Management Response. At 620, the eNB 310 transmits a Bearer Setup Response message to the MME 332 indicating that the bearer has been established and providing the selected GBR value. At 622, upon reception of the Bearer Setup Response message, the MME 332 changes the bearer context related to the respective request to include the value of the selected GBR and indicates to the Serving GW 334 that the bearer was established providing the GBR value. The Serving GW 334 can additionally provide this information to the PDN GW 334. At 624, the PDN GW 334 provides an indication to the PCRF 336 that the resources related to the PCC rule provided above were established with the new value of the GBR. Based on the available GBR, the UE 320 can in some cases be required to communicate the new codec parameters to the other party. As an example, this can be done via an IMS re-INVITE/UPDATE procedure 626, RTCP/RTP, or the like. In the case of RTCP/RTP, an IMS exchange can be required and/or otherwise utilized for charging or other purposes. In each situation an answer 628 is required to establish the acceptance of the new codec parameters.

Advantageously, the exemplary implementation presented in FIG. 6 may facilitate voice coder rate adaptation functionality without requiring an increase in call setup latency.

Figure 11:
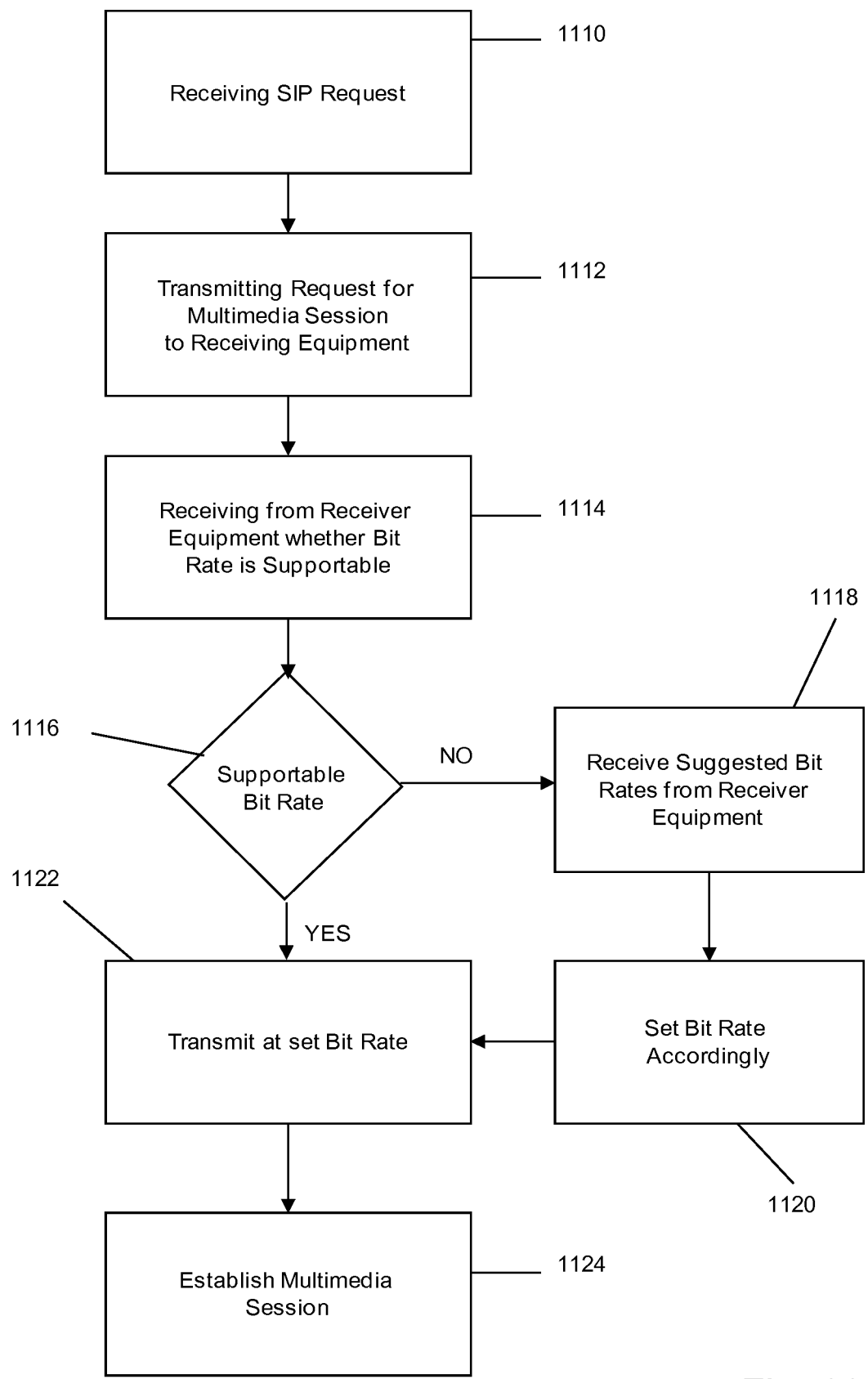
FIG. 11 is a call setup flow chart establishing a maximum supported bit rate with call setup in an exemplary implementation.

FIG. 11 is a flow chart showing the underlying method used in a wireless communication system of at least FIGS. 5 and 6. More specifically, FIG. 11 illustrates a method for determining a guaranteed bit rate for a call in a wireless communication system. It includes receiving (step 1110) a session initiation protocol (SIP) request from user equipment to a core network and receiving an answer at the user equipment from said core network and, at step 1112, transmitting from the core network to receiver equipment in communication with the user equipment a request for initiation of a multimedia communications session at a given bite rate value. Further, the method includes receiving at step 1114 from the receiver equipment a determination of whether the received core network requested bit rate value is less than the receiver equipment supportable guaranteed bit rate value. If at step 1116 it is determined that the received core network guaranteed bit rate is less than the receiver equipment supportable guaranteed bit rate, then the method includes causing transmission (step 1122) of the received core network guaranteed bit rate from the receiver equipment to the user equipment. But if the received core network guaranteed bit rate is determined at step 1116 to be greater than the receiver equipment supportable guaranteed bit rate, then the method includes receiving at step 1118 a maximum supportable guaranteed bit rate from the receiver equipment that has been transmitted to the core network and transmitting from the core network to the receiver equipment one or both of (A) a suggested guaranteed bit rate that is less than the maximum supportable guaranteed bit rate and (B) a plurality of suggested guaranteed bit rate values, each of which is less than maximum supportable guaranteed bit rate. The method further includes causing the setting of a bit rate at step 1120 selected from the suggested guaranteed bit rate received from the core network and causing transmission of the set bit rate from the receiver equipment to the user equipment device. Finally, at step 1124, the method establishes a multimedia session between user equipment using the set bit rate over the core network.

Figure 7:
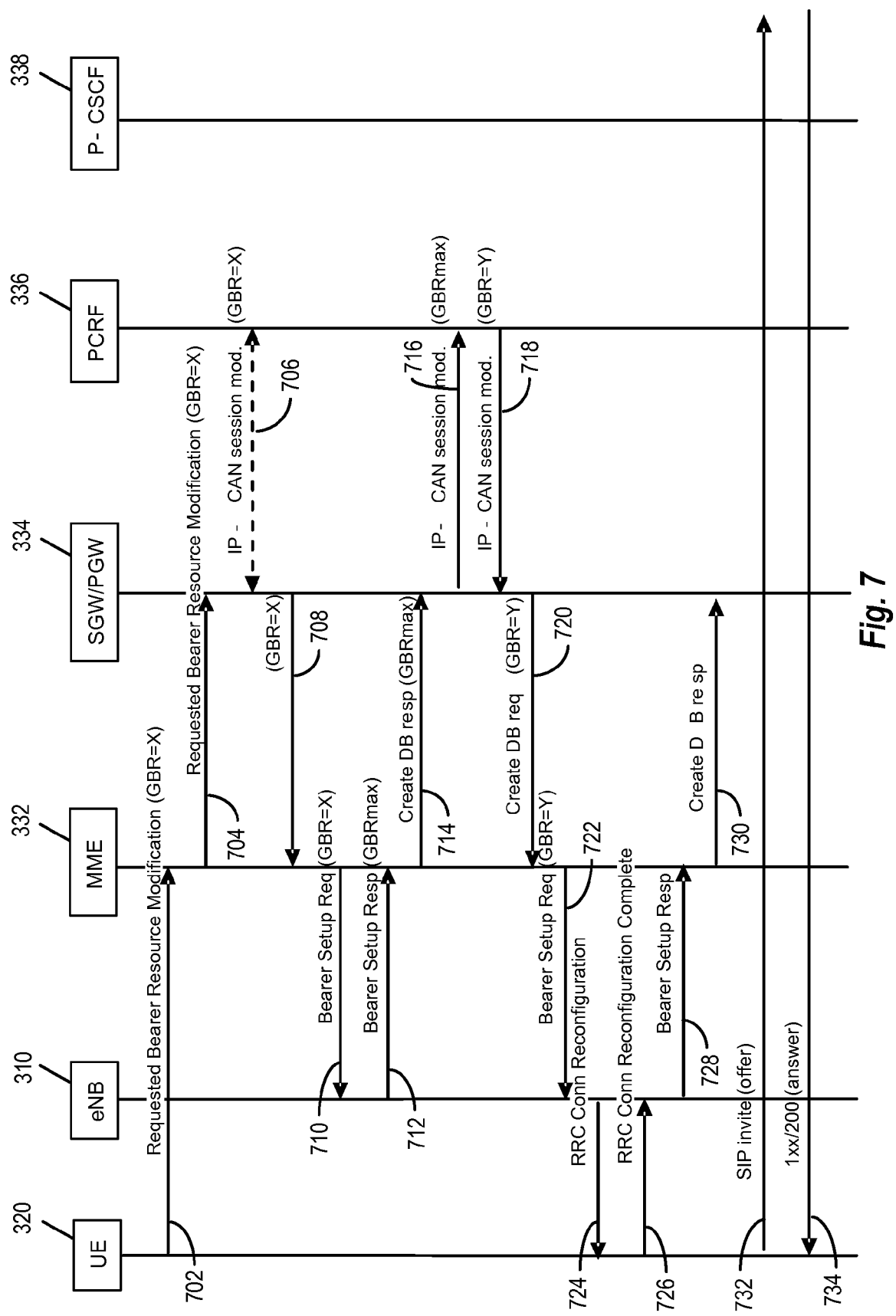
FIG. 7 is a call setup diagram establishing a maximum supported bit rate in an exemplary implementation.

In FIG. 7 an exemplary implementation of a call setup process in which various wireless communication implementations may in some cases elect not to utilize NetWork initiated (NW-initiated) QoS procedures for VoIP. Accordingly, it can be appreciated that the example solutions provided above can work in a similar manner for UE-initiated QoS scenarios. This non-limiting example illustrates a technique by which the negotiation and selection of a supported GBR can be applied in the event that a UE performs UE-initiated QoS procedures before the IMS negotiation.

In the exemplary implementation, at 702 a UE 320 performs UE-initiated QoS procedures by sending a request to the MME 332 before the IMS negotiation. At 704, the MME 332 transfers the requested bearer resource modification including a requested GBR to the SGW 334 and the SGW 334 transfers this request to the PDN-GW 334. At 706, the PDN-GW 334 provides the requested service information and GBR to the PCRF 336 in order to determine QoS resources and a GBR for the call establishment. This information can include SDP parameters and/or codec information. Also at 706 in a bi-directional communication, if dynamic PCC is deployed, the PCRF 336 sends a PCC decision provision message to the PDN GW 334, which can specify a QoS policy and/or include the QCI and GBR values. At 708, the PDN GW 334 uses the QoS policy to assign an EPS Bearer QoS and transmit a requested GBR. For example, the PDN GW 334 can assign values to various bearer level QoS parameters (e.g., QCI, ARP, GBR, MBR, etc.). In an aspect, the SGW 334 can additionally transmit a Create Bearer Request to the MME 332. At 710, the MME 332 selects an EPS Bearer Identity, which has not yet been assigned to the UE. The MME 332 then builds a Session Management Request that can include, among other parameters, the EPS Bearer QoS parameters and requested GBR. The MME 332 then signals a Bearer Setup Request message to the eNB 310, which can specify an EPS Bearer Identity, EPS Bearer QoS, requested GBR, Session Management Request, and S1-TEID.

At 712 of the exemplary implementation, the eNB 310 identifies that the GBR requirement for the VoIP call (e.g., identified by the QCI value) needs to be changed from what was initially negotiated between the UEs. In one example, this can comprise a decision for an implicit voice codec rate change. Further, the eNB 310 can transmit a Bearer Setup Response message to the MME 332 indicating that the bearer could not be established. The eNB 310 includes in the Bearer Setup Response message the maximum value of GBR which can be acceptable for incoming bearer requests related to the same QCI for the UE 320. At 714, upon reception of the Bearer Setup Response message, the MME 332 deletes the NAS context related to the respective request and indicates to the SGW 334 that the bearer was not established providing the GBRmax. The SGW 334 provides this information to the PDN GW 334. At 716, the PDN GW 334 provides an indication to the PCRF 336 that the resources related to the PCC rule provided above could not be established. Additionally, the PDN GW 334 provides the GBRmax value to the PCRF 336. However, the PCRF may not have sufficient service or codec information to derive a new GBR value. At 718, the PCRF 336, based on the received GBRmax value, may select a new value for the GBR that is within the received GBRmax value regardless of the lack of sufficient service or codec information and sends a PCC decision provision message to the PDN GW 334 that specifies a QoS policy and GBR value.

At 720, the PDN GW 334 uses the QoS policy to assign an EPS Bearer QoS. In this example implementation, the PDN GW 334 can assign values to various bearer level QoS parameters (e.g., QCI, ARP, GBR, MBR, etc.). Additionally, the SGW 334 can transmit a Create Bearer Request to the MME 332. At 722, the MME 332 selects an EPS Bearer Identity, which has not yet been assigned to the UE 320. The MME 332 then builds a Session Management Request that can include, among other parameters, the EPS Bearer QoS parameters. The MME 332 then signals a Bearer Setup Request message to the eNB 310, which can specify an EPS Bearer Identity, EPS Bearer QoS, Session Management Request, and S1-TEID. At 724, the eNB 310 maps the EPS Bearer QoS to the Radio Bearer QoS and signals a RRC Connection Reconfiguration message to the UE 320 that specifies a Radio Bearer QoS, Session Management Request, and EPS Radio Bearer (RB) Identity.

After receiving the RRC Connection Reconfiguration message, the UE 320 acknowledges the radio bearer activation to the eNB 310 with a RRC Connection Reconfiguration Complete message at 726. The UE NAS layer additionally builds a Session Management Response including EPS Bearer Identity. While not shown in FIG. 7, the UE 320 can then transmit a Direct Transfer message to the eNB 310 that includes a Session Management Response. At 728, the eNB 310 acknowledges the bearer activation to the MME 332 with a Bearer Setup Response message that includes an EPS Bearer Identity and S1-TEID. The eNB 310 further indicates that the requested EPS Bearer QoS was allocated. Additionally, the eNB 310 transmits an Uplink NAS Transport message to the MME 332 that includes a Session Management Response. Upon reception of the Bearer Setup Response message and the Session Management Response message, the MME 332 acknowledges the bearer activation to the SGW 334 at 730.

Based on the available GBR the UE 320 initiates 732 or is involved in a terminating call and performs an IMS exchange which includes a negotiation of the codec parameters 734.

Figure 8:
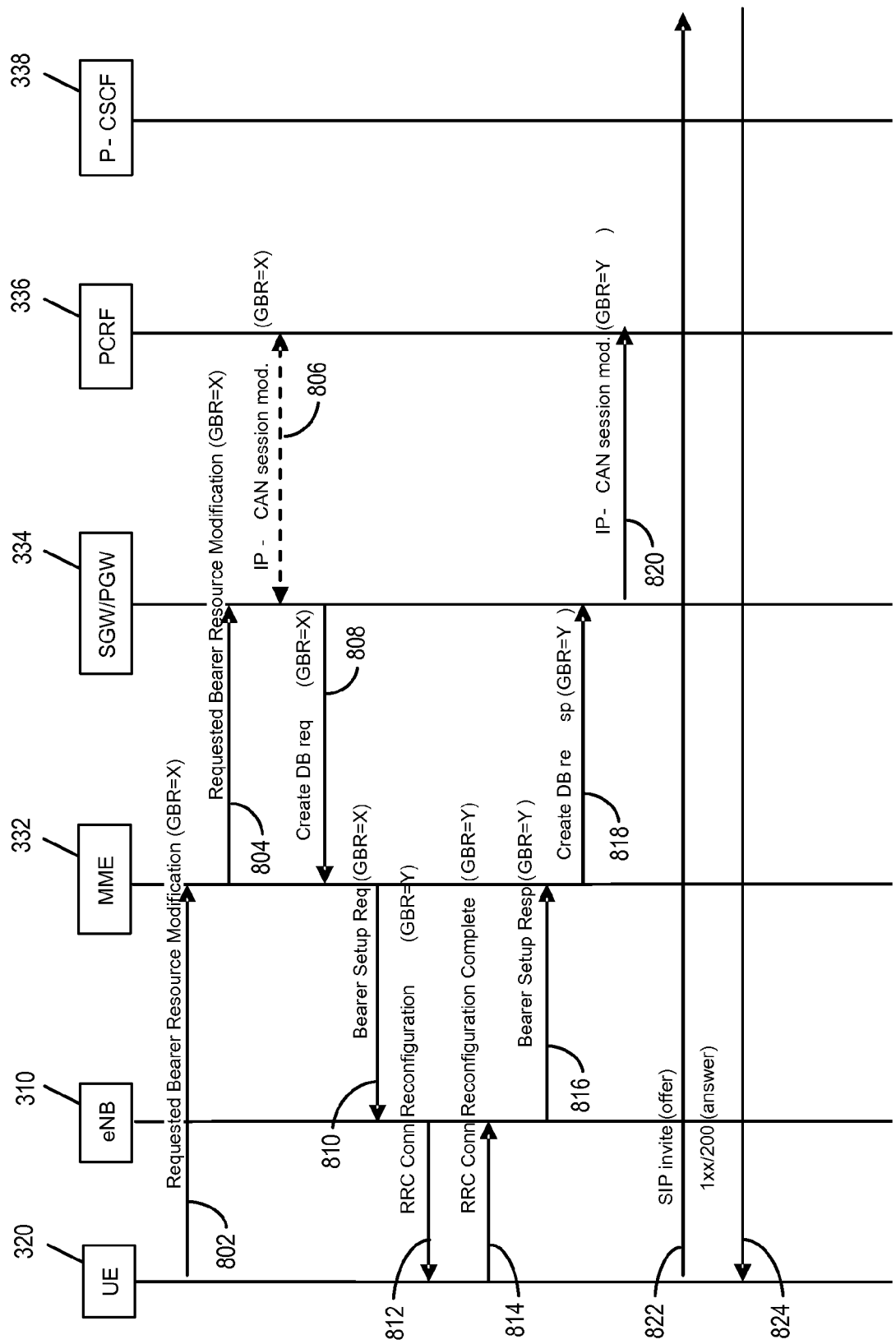
FIG. 8 is a call setup diagram establishing a maximum supported bit rate with rapid call setup in an exemplary implementation.

In an additional exemplary implementation, FIG. 8 illustrates another example solution for UE-initiated QoS procedures that reduces call setup time by enabling the eNB 310 to choose a GBR rate Y which can be equal to or below the GBR rate X authorized by the PCRF 336. This may enable the eNB to set up the bearer without having to confirm with the PCRF 336. In one example, the eNB 310 does not have service or codec information to derive a GBR rate that matches the codecs in the UE 320. Thus, the eNB 310 can determine Y based on its loading conditions and/or pre-provisioned information about possible codec rates to be supported in the network.

In the exemplary implementation, at 802 a UE 320 performs UE-initiated QoS procedures by sending a request to the MME 332 before the IMS negotiation. At 804, the MME 332 transfers the requested bearer resource modification including a requested GBR to the SGW 334 and the SGW 334 transfers this request to the PDN-GW 334. At 806, the PDN-GW 334 provides the requested service information and GBR to the PCRF 336 in order to determine QoS resources and a GBR for the call establishment. This information can include SDP parameters and/or codec information. Also at 706 in a bi-directional communication, if dynamic PCC is deployed, the PCRF 336 sends a PCC decision provision message to the PDN GW 334, which can specify a QoS policy and/or include the QCI and GBR values. At 808, the PDN GW 334 uses the QoS policy to assign an EPS Bearer QoS. In this example implementation, the PDN GW 334 can assign values to various bearer level QoS parameters (e.g., QCI, ARP, GBR, MBR, etc.). Additionally, the SGW 334 can transmit a Create Bearer Request to the MME 332. At 810, the MME 332 selects an EPS Bearer Identity, which has not yet been assigned to the UE 320. The MME 332 then builds a Session Management Request that can include, among other parameters, the EPS Bearer QoS parameters. The MME 332 then signals a Bearer Setup Request message to the eNB 310, which can specify an EPS Bearer Identity, EPS Bearer QoS, Session Management Request, and S1-TEID.

In the exemplary implementation at 812, the eNB 310 selects a GBR value that is acceptable for the VoIP call (e.g., identified by the QCI value) and maps the EPS Bearer QoS to the Radio Bearer QoS using the selected GBR value without having to confirm the GBR value with the PCRF 336. It then signals a RRC Connection Reconfiguration message to the UE 320 that specifies a Radio Bearer QoS, selected GBR, Session Management Request, and EPS RB Identity. At 814, the UE 320 acknowledges the radio bearer activation to the eNB 310 with a RRC Connection Reconfiguration Complete message. In one example, at this step the UE 320 can receive a requested GBR value in the NAS message. The eNB 310 does not have service or codec information to derive a GBR rate that matches the codecs in the UE 320. Thus, the eNB 310 can determine a GBR value based on its loading conditions and/or pre-provisioned information about possible codec rates to be supported in the network. In such an example, the UE can consider the value in the RRC message to be valid and accordingly update its bearer context. Further, the UE NAS layer can build a Session Management Response including EPS Bearer Identity. At 816, the eNB 310 transmits a Bearer Setup Response message to the MME 332 indicating that the bearer has been established and providing the selected GBR value. At 818, upon reception of the Bearer Setup Response message, the MME 332 changes the bearer context related to the respective request to include the value of the selected GBR and indicates to the SGW 334 that the bearer was established providing the GBR value. The SGW 334 can additionally provide this information to the PDN GW 334. At 820, the PDN GW 334 provides an indication to the PCRF 336 that the resources related to the PCC rule provided above were established with the new value of the GBR.

Based on the selected GBR the UE 310 initiates 822 or is involved in a terminating call and performs an IMS exchange which includes a negotiation of the codec parameters 824. Advantageously, this example as presented may facilitate voice coder rate adaptation functionality for UE-initiated QoS procedures without requiring an increase in call setup latency.

Figure 12:
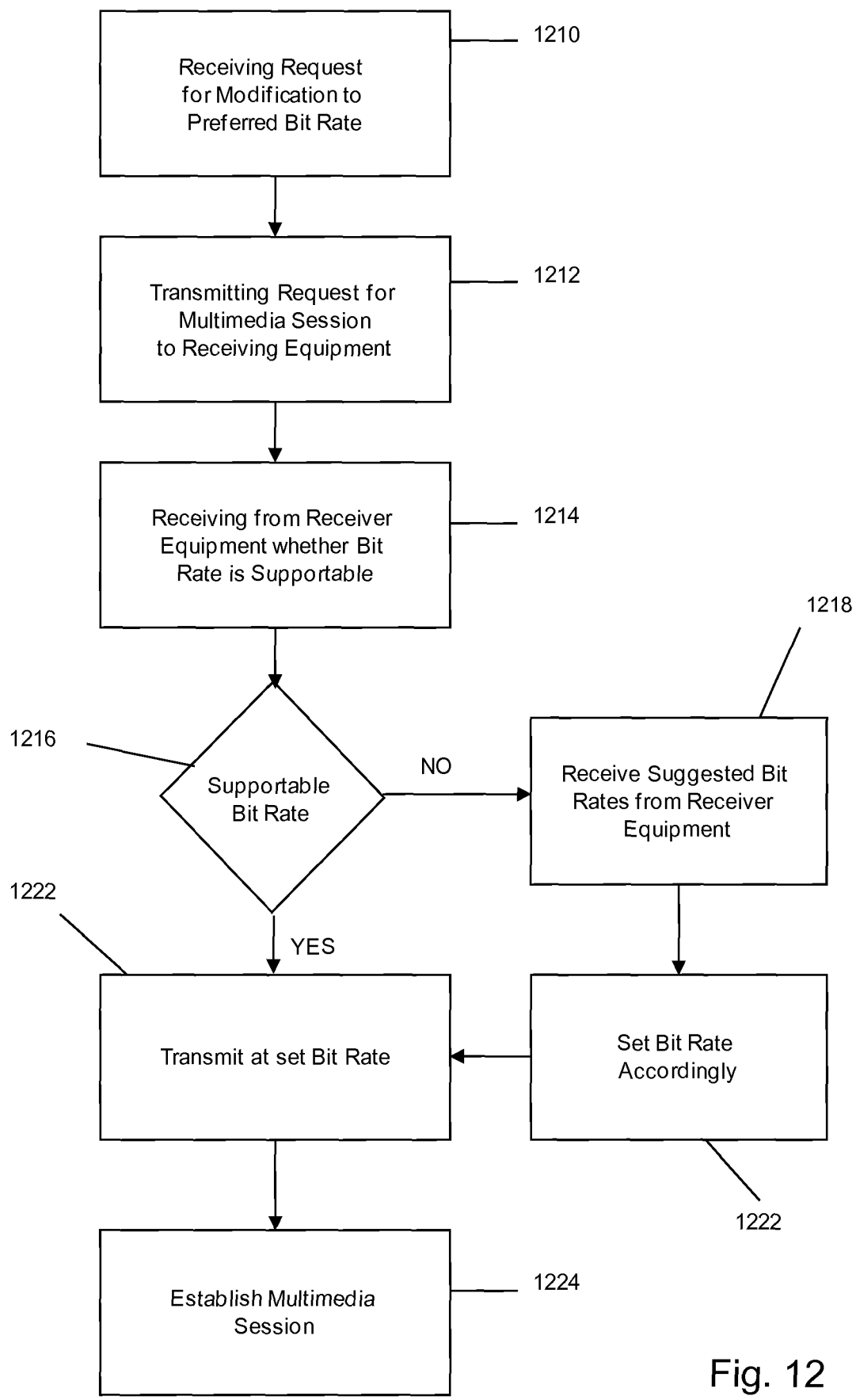
FIG. 12 is a call setup flow chart establishing a maximum supported bit rate with call setup in an exemplary implementation.

FIG. 12 is a flow chart showing the underlying method used in a wireless communication system of FIGS. 7 and 8. More specifically, FIG. 12 illustrates a method for determining a guaranteed bit rate for a call in a wireless communication system which includes step 1210 of receiving from user equipment a request for a modification to a preferred bit rate for communications between a core network and said user equipment, and at step 1212, transmitting from the core network to receiver equipment in communication with the user equipment a request for initiation of a multimedia communications session at said preferred bit rate. Further included is step 1214 of causing a determination at the receiver equipment of whether the received core network requested bit rate is less than the receiver equipment supportable guaranteed bit rate. If it is determined at step 1216 the received core network guaranteed bit rate is greater than the receiver equipment supportable guaranteed bit rate, then at step 1218 the method involves receiving a maximum supportable guaranteed bit rate from the receiver equipment to the core network, transmitting from the core network to the receiver equipment one or both of (A) a suggested guaranteed bit rate that is less than the maximum supportable guaranteed bit rate and (B) a plurality of suggested guaranteed bit rate values, each of which is less than maximum supportable guaranteed bit rate. The method also includes step 1222 of causing the setting of a bit rate to the suggested guaranteed bit rate sent from the core network and causing transmission of the set bit rate from the receiver equipment to the user equipment device; and at step 1224 receiving a session initiation protocol (SIP) request from user equipment to a core network and transmitting an answer at the user equipment from said core network with said set bit rate.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

As used in this application, the terms "component," "module," "system" and the like, as well as the UE 320, eNB 310, MME 332, SGW/PGW 334, PCRF 336 and P-CSCF 338 specifically identified herein, are intended to include a computer-related entity, such as but not limited to hardware, firmware, a combination of hardware and software, including software recorded on a computer-readable recording (storage) medium that, when executed by a processor of a computing device (e.g., CPU), causes the computing device to perform operations defined in the software. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution, and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

In one configuration, the apparatus for wireless communication includes means for receiving, means for establishing and means for identifying. In one aspect, the aforementioned means may be processor(s) implemented in the MME 332, P-CSCF 338 and PCRF 336 of the core network, which can be unitary or distributed computing physical processors configured to perform the functions recited by the aforementioned means. In another aspect, the aforementioned means may be a module or any apparatus configured to perform the functions recited by the aforementioned means.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A wireless communication apparatus, the apparatus comprising:

means for identifying initialization of a multimedia communication session between user equipment over a core network and at least one receiving equipment;
means for establishing a bit rate for said multimedia communication; and
means for receiving information identifying load information and bit rate information including a plurality of candidate guaranteed bit rates that are acceptable to said receiving equipment related to the multimedia communication session and for providing said load information to said means for establishing said bit rate,
wherein said means for establishing said bit rate establishes said bit rate at or below said bit rate that is acceptable to said receiving equipment related to the multimedia communication session, said bit rate being a guaranteed bit rate for said multimedia communication session for said user equipment; and wherein said means for establishing said bit rate assigns at least one voice coder rate parameter for the communication session based on the plurality of candidate guaranteed bit rates.

2. The apparatus of claim 1, wherein said means for establishing said bit rate is part of said core network and not said receiving equipment.

3. The apparatus of claim 1, wherein said bit rate information received by said means for receiving is transmitted by said receiving equipment, which includes means to broadcast load information indicating said guaranteed bit rate based on the load information, and
wherein said means for receiving communications about acceptable bit rate information receives said bit rate information from user equipment that receives said broadcast load information and communicates said load information to said means for establishing said bit rate.

4. The apparatus of claim 1, wherein said means for receiving communications regarding acceptable bit rate information receives said bit rate information from said receiving equipment in response to a communication from the core network to establish a communication link with said user equipment that is not acceptable to said receiving equipment.

5. The apparatus of claim 1, wherein said means for establishing said bit rate includes a Policy control and Charging Rules Function, said receiving equipment is an evolved Node B, in a system that is a Long Term Evolution based system.

6. A wireless communication apparatus, the apparatus comprising:
a session control function module identifying initialization of a multimedia communication session between user equipment over a core network and at least one receiving equipment;
a policy control function module establishing a bit rate for said multimedia communication session between user equipment;
a mobility management module receiving communications of bit rate information identifying a plurality of candidate guaranteed bit rates that are acceptable to said receiving equipment related to the multimedia communication session to said means for establishing said bit rate,
wherein said policy control function module establishes said bit rate at or below said bit rate that is acceptable to said receiving equipment related to the multimedia communication session, said bit rate being a guaranteed bit rate for said multimedia communication session for said user equipment, and wherein said policy control function module assigns at least one voice coder rate parameter for the communication session based on the plurality of candidate guaranteed bit rates.

7. The apparatus of claim 6, wherein said policy control function module is part of said core network and not said receiving equipment.

8. The apparatus of claim 6, wherein bit rate information received by said mobility management module is transmitted by said receiving equipment, which broadcasts load information indicating said guaranteed bit rate based on the load information, and
wherein said mobility management module receives said bit rate information from user equipment that receives said broadcast load information and communicates said load information to said policy control function module.

9. The apparatus of claim 6, wherein said receiving equipment is an evolved Node B, in a system that is a Long Term Evolution, based system.

10. A method used in a wireless communication system, the method comprising:
identifying initialization of a multimedia communication session between user equipment over a core network and at least one receiving equipment;
establishing a bit rate for said multimedia communication session between user equipment; and
receiving load information and bit rate information identifying a plurality of candidate guaranteed bit rates that are acceptable to said receiving equipment related to the multimedia communication session to establish said bit rate for said multimedia communication session between user equipment, and;
assigning at least one voice coder rate parameter to the communication session based on a selected one of the plurality of candidate guaranteed bit rates,
wherein said bit rate for said multimedia communication session between user equipment is established at said bit rate at or below said bit rate that is acceptable to said receiving equipment related to the multimedia communication session, said bit rate being one of the plurality of candidate guaranteed bit rates for said multimedia communication session between user equipment.

11. The method of claim 10, further comprising receiving broadcast load information indicating an allowable guaranteed bit rate.

12. The method of claim 10, further comprising determining a requested guaranteed bit rate for the communication session and transmitting a suggested allowable guaranteed bit rate for the communication session if the requested guaranteed bit rate exceeds a maximum allowable guaranteed bit rate.

13. A non-transitory computer-readable medium executable by a computer, the medium comprising executable code for:
identifying initialization of a multimedia communication session between user equipment over a core network and at least one receiving equipment;
establishing a bit rate for said multimedia communication session between user equipment; and
receiving load information and bit rate information identifying a plurality of candidate guaranteed bit rates that are acceptable to said receiving equipment related to the multimedia communication session to establish said bit rate for said multimedia communication session between user equipment,
wherein said bit rate for said multimedia communication session between user equipment is established at said bit rate at or below said bit rate that is acceptable to said receiving equipment related to the multimedia communication session, said bit rate being a guaranteed bit rate for said multimedia communication session between user equipment, and wherein at least one voice coder rate parameter for the communication session is assigned based on the plurality of candidate guaranteed bit rates.

14. A method for determining a guaranteed bit rate for a call in a wireless communication system, comprising:
receiving a session initiation protocol request from user equipment to a core network and receiving an answer at the user equipment from said core network;
transmitting from the core network to receiver equipment in communication with the user equipment a request for initiation of a multimedia communications session at a given bit rate value;
receiving from the receiver equipment a determination of whether the received core network requested bit rate value is less than the receiver equipment supportable guaranteed bit rate value;
when the received core network guaranteed bit rate is less than the receiver equipment supportable guaranteed bit rate, then:
causing transmission of the received core network guaranteed bit rate from the receiver equipment to the user equipment;
when the received core network guaranteed bit rate is greater than the receiver equipment supportable guaranteed bit rate, then:
receiving a maximum supportable guaranteed bit rate from the receiver equipment that has been transmitted to the core network;
transmitting from the core network to the receiver equipment one or both of (A) a suggested guaranteed bit rate that is less than the maximum supportable guaranteed bit rate and (B) a plurality of suggested guaranteed bit rate values, each of which is less than maximum supportable guaranteed bit rate; and
causing the setting of a bit rate selected from the suggested guaranteed bit rate received from the core network;
causing transmission of the set bit rate from the receiver equipment to the user equipment device; and
establishing said multimedia communications session between user equipment using the set bit rate over the core network.

15. A method according to claim 14, further comprising receiving re-transmitting a session initiation protocol request from user equipment at a core network and transmitting an answer to the user equipment from said core network.

16. A non-transitory computer-readable medium executable by a computer, the medium comprising executable code for:
receiving a session initiation protocol request from user equipment to a core network and receiving an answer at the user equipment from said core network;
transmitting from the core network to receiver equipment in communication with the user equipment a request for initiation of a multimedia communications session at a given bit rate value;
receiving from the receiver equipment a determination of whether the received core network requested bit rate value is less than the receiver equipment supportable guaranteed bit rate value;
when the received core network guaranteed bit rate is less than the receiver equipment supportable guaranteed bit rate, then:
causing transmission of the received core network guaranteed bit rate from the receiver equipment to the user equipment;
when the received core network guaranteed bit rate is greater than the receiver equipment supportable guaranteed bit rate, then:
receiving a maximum supportable guaranteed bit rate from the receiver equipment that has been transmitted to the core network;
transmitting from the core network to the receiver equipment one or both of (A) a suggested guaranteed bit rate that is less than the maximum supportable guaranteed bit rate and (B) a plurality of suggested guaranteed bit rate values, each of which is less than maximum supportable guaranteed bit rate; and
causing the setting of a bit rate selected from the suggested guaranteed bit rate received from the core network;
causing transmission of the set bit rate from the receiver equipment to the user equipment device; and
establishing said multimedia communications session between user equipment using the set bit rate over the core network.

17. A method for determining a guaranteed bit rate for a call in a wireless communication system, comprising:
causing transmission of bit rate information from receiver equipment to user equipment;
receiving a session initiation protocol request from user equipment to a core network including bit rate information including a plurality of candidate guaranteed bit rates based on rate information from receiver equipment and transmitting an answer at the user equipment from said core network;
transmitting from the core network to receiver equipment in communication with the user equipment a request for initiation of a multimedia communications session at a bit rate value at or less than said guaranteed bit rate;
causing a setting of a bit rate from the plurality of candidate guaranteed bit rates received from the core network by the receiving equipment;
causing transmission of the set bit rate from the receiver equipment to the user equipment device; and
establishing said multimedia communications session between user equipment using the set bit rate value received from the core network over the core network.

18. A non-transitory computer-readable medium executable by a computer, the medium comprising executable code for:
causing transmission of bit rate information from receiver equipment to user equipment;
receiving a session initiation protocol request from user equipment to a core network including bit rate information including a plurality of candidate guaranteed bit rates from receiver equipment and transmitting an answer at the user equipment from said core network;
transmitting from the core network to receiver equipment in communication with the user equipment a request for initiation of a multimedia communications session at a bit rate value at or less than a guaranteed bit rate;
causing a setting of said bit rate from the plurality of candidate guaranteed bit rates received from the core network by the receiving equipment;
causing transmission of the set bit rate from the receiver equipment to the user equipment device; and
establishing said multimedia communications session between user equipment using the set bit rate value received from the core network over the core network.

19. A method for determining a guaranteed bit rate for a call in a wireless communication system, comprising:

receiving from user equipment a request for a modification to a preferred bit rate for communications between a core network and said user equipment;

transmitting from the core network to receiver equipment in communication with the user equipment a request for initiation of a multimedia communications session at said preferred bit rate;

causing a determination at the receiver equipment of whether the received core network requested bit rate is less than the receiver equipment supportable guaranteed bit rate;

when the received core network guaranteed bit rate is greater than the receiver equipment supportable guaranteed bit rate, then:

receiving a maximum supportable guaranteed bit rate from the receiver equipment to the core network;

transmitting from the core network to the receiver equipment one or both of (A) a suggested guaranteed bit rate that is less than the maximum supportable guaranteed bit rate and (B) a plurality of suggested guaranteed bit rate values, each of which is less than maximum supportable guaranteed bit rate;

causing the setting of said bit rate to the suggested guaranteed bit rate sent from the core network;

causing transmission of the set bit rate from the receiver equipment to the user equipment device; and receiving a session initiation protocol request from user equipment to said core network and transmitting an answer at the user equipment from said core network with said set bit rate.

20. A non-transitory computer-readable media executable by a computer, the medium comprising executable code for:

receiving from user equipment a request for a modification to a preferred bit rate for communications between a core network and said user equipment;

transmitting from the core network to receiver equipment in communication with the user equipment a request for initiation of a multimedia communications session at said preferred bit rate;

causing a determination at the receiver equipment of whether the received core network requested bit rate is less than the receiver equipment supportable guaranteed bit rate;

when the received core network guaranteed bit rate is greater than the receiver equipment supportable guaranteed bit rate, then:

receiving a maximum supportable guaranteed bit rate from the receiver equipment to the core network;

transmitting from the core network to the receiver equipment one or both of (A) a suggested guaranteed bit rate that is less than the maximum supportable guaranteed bit rate and (B) a plurality of suggested guaranteed bit rate values, each of which is less than maximum supportable guaranteed bit rate;

causing the setting of said bit rate to the suggested guaranteed bit rate sent from the core network;

causing transmission of the set bit rate from the receiver equipment to the user equipment device; and receiving a session initiation protocol request from user equipment to said core network and transmitting an answer at the user equipment from said core network with said set bit rate.

\* \* \* \* \*